(12) United States Patent
Ward

(10) Patent No.: US 6,540,463 B2
(45) Date of Patent: Apr. 1, 2003

(54) BLIND HOLE PANEL NUT

(75) Inventor: Michael E. Ward, Geneva, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 09/940,914

(22) Filed: Aug. 27, 2001

(65) Prior Publication Data

US 2003/0039529 A1 Feb. 27, 2003

(51) Int. Cl.[7] ................................................ F16B 37/04
(52) U.S. Cl. ...................................... 411/173; 411/349
(58) Field of Search ............................. 411/427, 172, 411/173, 349, 550, 551, 350

(56) References Cited

U.S. PATENT DOCUMENTS

| | | | |
|---|---|---|---|
| 3,190,167 A | * | 6/1965 | Holton |
| 4,227,722 A | * | 10/1980 | Barber |
| 4,770,586 A | * | 9/1988 | Osterland |
| 4,906,152 A | * | 3/1990 | Kurihara |
| 5,098,765 A | * | 3/1992 | Bien |

FOREIGN PATENT DOCUMENTS

DE 26 26 046 A1 * 12/1976

* cited by examiner

*Primary Examiner*—Flemming Saether
(74) *Attorney, Agent, or Firm*—Welsh & Katz, Ltd.; Paul F. Donovan; Mark W. Croll

(57) ABSTRACT

A blind hole panel nut has an elongated geometrical configuration. The nut is adapted to be inserted and mounted within a similarly shaped aperture defined within a support panel upon which a component is to be mounted. The nut has slots formed within opposite longitudinal end portions thereof and at mid-depth portions such that upper and lower nut disk portions are formed. The nut is rotated a predetermined angle from its initial insertion position with respect to the support panel aperture to its locked position upon the support panel. The slots physically accommodate side wall portions of the support panel which define the aperture. The upper and lower nut disk portions self-support the nut member upon the support panel. The nut member is also provided with a centrally located threaded aperture for receiving a threaded bolt fastener to form a blind hole panel nut member and bolt fastener assembly.

38 Claims, 3 Drawing Sheets

BLIND HOLE PANEL NUT

BACKGROUND OF THE INVENTION

The present invention relates generally to fastener components and systems, and more particularly to a new and improved blind hole panel nut, and a blind hole panel nut and bolt fastener assembly, for providing a blind hole fastener which not only permits installation of fastener components from only one accessible side of a fastener location, but in addition, facilitates easy installation and removal of the fastener assembly, and still further, permits the nut member to be independently self-supported upon a panel or plate member prior to installation or insertion of the corresponding bolt member.

Blind hole fasteners, such as, for example, nut type fasteners, wherein such fasteners are able to be installed from only one accessible side of a fastener location, for example, a front or forward side, are of course well known. One well known type of blind hole fastener comprises snap-in fasteners wherein fasteners are snap-fitted into fastener site locations from the front or forward accessible side of the location and which are therefore also able to be independently self-supported upon a plate or panel in preparation for subsequent engagement by, for example, a bolt member. Such snap-in fasteners are exemplified by means of U.S. Pat. No. 5,746,559 which issued to Shirai on May 5, 1998, and U.S. Pat. No. 2,649,884 which issued to Westover on Aug. 25, 1953. A major disadvantage or drawback characteristic of such snap-in fasteners, however, as can readily be appreciated, is that while such fasteners are relatively easy to install, such fasteners are somewhat difficult to remove or exchange should such an operation become necessary because it is difficult to in effect reverse the snap-in procedure as it is usually necessary to access the snap-in fasteners from the opposite, back or rear side of the fastener location which is usually in fact inaccessible.

Another type of blind hole self-supporting fastener is disclosed within U.S. Pat. No. 1,912,100 which issued to Rosenberg on May 30, 1933. In accordance with the disclosure of this patent, the fastener comprises a rectangular plate 1 and a pair of oppositely extending winged feet 7,7 which are fixed at central portions of the longer sides of the plate 1. To install the fastener within an apertured plate or panel 2, the feet 7,7 engage the accessible side of the plate or panel 2 while one end of the plate 1 is inserted through the aperture 8 of the plate or panel 2, the plate 1 is then slid toward one extreme end of the aperture 8 so as to permit the other end of the plate 1 to be effectively inserted through the aperture 8 of the plate or panel 2, and finally, the plate 1 is slid in the reverse direction with respect to aperture 8 so as to effectively center the fastener upon the plate or panel 2 and with respect to aperture 8. The disadvantage or drawback of this particular type of fastener is that due to the lateral shiftability of the fastener with respect to the lateral boundaries of the aperture 8, the stability characteristics of such fastener may not be sufficient for a large number of fastener applications. More particularly, it is possible for the fastener to be inadvertently withdrawn from the aperture 8 in view of the fact that if the fastener is laterally moved back to its original or first insertion position, one end of the plate 1 could be dislodged from its respective end of the aperture 8 resulting in possible withdrawal of the fastener from the aperture 8.

A third type of fastener, which is useable in connection with the fastener type applications with which the present invention is concerned, comprises well known quarter turn fasteners. The operational disadvantage or drawback characteristic of conventional quarter-turn fasteners, however, is that such fasteners are normally not self-supporting with respect to the support panel or plate upon which the fastener is to be installed. That is, such fasteners cannot normally be installed upon the plate or panel prior to insertion, installation, or engagement of a bolt or similar fastener with the quarter-turn fastener.

A need therefore exists for a new and improved blind hole plate or panel nut-type fastener which renders installation and removal relatively easy, provides the requisite amount of stability, and which is able to be self-supporting with respect to the base plate or panel upon which the panel nut is to be installed and prior to installation, insertion, or engagement of an operatively associated bolt fastener with the panel nut.

SUMMARY OF THE INVENTION

A blind hole panel nut, and blind hole panel nut and bolt fastener assembly includes a nut member having a predetermined geometrical configuration, such as, for example, rectangular, elliptical, or diamond-shaped, as defined by major or longitudinal and minor or lateral axes or dimensions as well as relatively long sides and relatively short ends.

The nut member having such a predetermined geometrical configuration is adapted to be inserted within a correspondingly shaped aperture formed within a support panel or plate member upon which a nut and bolt fastener assembly is to be mounted. The nut member also has a predetermined axial depth and is provided with an axially oriented threaded bore, for threadedly receiving a bolt fastener. The threaded bore is located substantially centrally within the nut member so as to be disposed at the intersection of the major or longitudinal and minor or lateral axes. Slots are formed at mid-portions of the nut member, as considered in the axial depth direction, within opposite longitudinal ends of the nut member so as to extend longitudinally inwardly from the opposite relatively shorts ends of the nut member toward the centrally located threaded bore as well as to extend laterally across the nut member from one relatively long side to the other.

The present blind hole panel nut, and blind hole panel nut and bolt fastener assembly, overcomes the various disadvantages and drawbacks characteristic of prior art fasteners and fastener assemblies.

The improved blind hole panel nut, and blind hole panel nut and bolt fastener assembly, are able to be self-supporting with respect to a base plate or panel upon which the panel nut is to be installed and prior to installation, insertion, or engagement of an operatively associated bolt fastener with the panel nut.

The blind hole panel nut, and blind hole panel nut and bolt fastener assembly, render installation and removal relatively easy from either side of a support panel or plate and provide the requisite amount of stability required for the particular application purposes.

In a current embodiment, the opposite slotted end portions of the nut member include, as considered in the axial depth direction, an upper nut plate or disk portion, an axially central slotted portion, and a lower nut plate or disk portion. Accordingly, when the nut member is to be inserted or mounted upon the support panel or plate member, upon which the blind hole panel nut and bolt fastener assembly is to be mounted, the nut member having its predeterminedly unique configuration is inserted into the correspondingly configured aperture defined within the support panel or plate such that the major and minor axes or dimensions of the nut member and the support plate or panel are aligned with each other.

In addition, the nut member is inserted into the aperture defined in the support panel or plate in the depth-wise direction such that the slot portions of the nut member are aligned in a planar manner with the support panel or plate. Subsequently, the nut member is rotated a predetermined angle from its originally inserted position whereby the major axis or dimension of the nut member is now disposed transversely with respect to the aperture defined within the support plate or panel, or in other words, whereby the major axis or dimension of the nut member is effectively aligned with the minor axis or dimension of the support plate or panel aperture. In a current embodiment, the nut member is rotated 90° from its originally inserted position.

In view of the fact that the upper and lower nut plate or disk portions are now disposed upon opposite sides of the support plate or panel so as to be respectively disposed in surface contact with the outer surface and inner or undersurface portions of the support plate or panel, the nut member is securely mounted upon the support plate or panel.

In a present embodiment, the blind hole panel nut includes a panel engaging element. The upper and lower disk portions define inner wall portions and the panel engaging element can be formed as a tapering surface on one or both of the inner wall portions. The tapering surface tapers toward the opposing wall portions.

The inner wall surfaces can along the first major longitudinal axis or along the second minor lateral axis.

Other features and advantages of the present invention will be apparent from the following detailed description, the accompanying drawings, and the appended claims.

BRIEF DESCRIPTION OF THE FIGURES

Various other objects, features, and attendant ad-vantages of the present invention will be more fully appreciated from the following detailed description when considered in connection with the accompanying drawings in which like reference characters designate like or corresponding parts through-out the several views, and wherein.

DETAILED DESCRIPTION OF THE INVENTION

Figure 1:
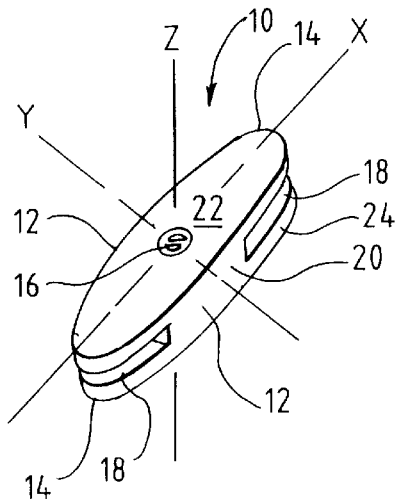
FIG. 1 is a perspective view of a first embodiment of a new and improved blind hole panel nut member constructed in accordance with the principles and teachings of the present invention so as to have a substantially elliptical configuration and showing the various structural component parts thereof.

While the invention is susceptible to various embodiments, there is shown in the drawings and will hereinafter be described a specific embodiment with the understanding that the present disclosure is to be considered an exemplification of the invention and is not intended to limit the invention to the specific embodiment illustrated and described.

It is to be further understood that the title of this section of the specification, namely, "Detailed Description of the Invention," relates to a requirement of the United States Patent and Trademark Office, and does not imply, nor should be inferred to limit the subject matter disclosed herein and the scope of the present invention.

Referring now to the drawings, and more particularly to FIG. 1, a first embodiment of a new and improved blind hole panel nut member, constructed in accordance with the principles and teachings of the present invention, is disclosed and is generally indicated by the reference character 10. More particularly, it is seen that the blind hole panel nut member 10 has a predetermined geometrical configuration which, in accordance with this embodiment, is substantially elliptical.

The elliptical nut member 10 is defined by a major or longitudinal axis X defining a major dimension and a minor or lateral axis Y defining a minor dimension which is less than that of the major dimension and which is disposed substantially perpendicular to the major axis X. Accordingly, the elliptical nut member 10 includes a pair of oppositely disposed relatively long sides 12,12 and a pair of oppositely disposed relatively short ends 14,14.

The nut member 10 is also provided with a threaded bore 16 which is oriented along an axial direction Z which is oriented substantially perpendicular to the plane defined by means of the major and minor axes X,Y and which is located at substantially the geometrical center of the nut member 10 as defined by the intersection of the major and minor axes X,Y. As will be described, and therefore appreciated, more in detail hereinafter, threaded bore 16 is adapted to receive a bolt fastener so as to form a blind hole panel nut and bolt fastener assembly which facilitates the installation and removal of the nut member 10 from a support panel or plate upon which the nut member 10 is to be mounted.

With continued reference being made to FIG. 1, it is seen and appreciated that, as considered in the axial direction taken along axis Z, the nut member 10 has a predetermined depth dimension or thickness. In accordance with the unique and novel structural characteristics developed in accordance with the principles and teachings of the present invention, it is seen that the opposite longitudinal end portions of the nut member 10, as considered along the major axis X, are provided with slots 18,18 which are formed at mid-portions of the nut member 10 as considered in the axial depth direction as taken or considered along axis Z. As can be appreciated from FIG. 1, the slots 18,18 respectively extend longitudinally inwardly from the short ends 14,14 of the nut member 10 toward the centrally located threaded bore 16 and, in addition, extend laterally across the nut member 10 from one relatively long side 12 to the other relatively long side 12.

Figure 3:
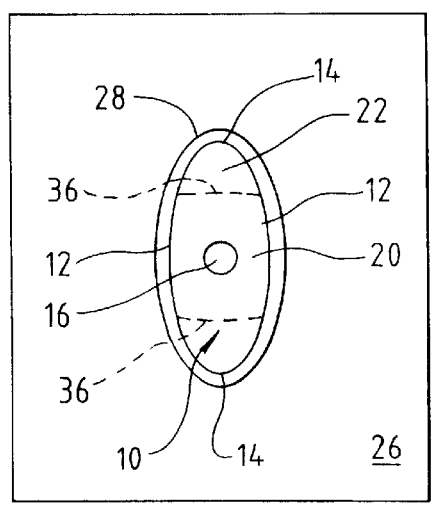
FIG. 3 is a top plan view of the support plate or panel shown in FIG. 2 and additionally showing the initial insertion position of the blind hole panel nut member shown in FIG. 1 as mounted within the predeterminedly configured aperture defined within the support plate or panel and prior to rotation of the blind hole panel nut member to its locked position upon the support plate or panel.
Figure 4:
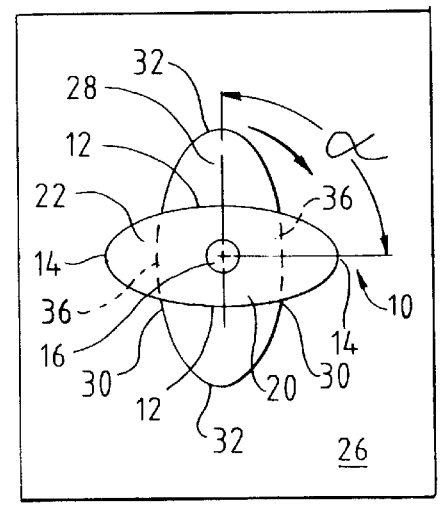
FIG. 4 is a top plan view similar to that of FIG. 3 showing, however, the position of the blind hole panel nut member rotated 90° from its initial insertion position upon the support plate or panel to its locked position upon the support plate or panel.

As a result of the formation of such slots 18, 18 as noted, a solid central core portion 20, within which threaded bore 16 is defined, is formed within nut member 10 as is best seen or appreciated from FIGS. 3 and 4, and in addition, there is also formed an upper nut plate or disk portion 22 and a lower nut plate or disk portion 24 which are integrally connected to each other by means of the central core portion 20.

Figure 2:
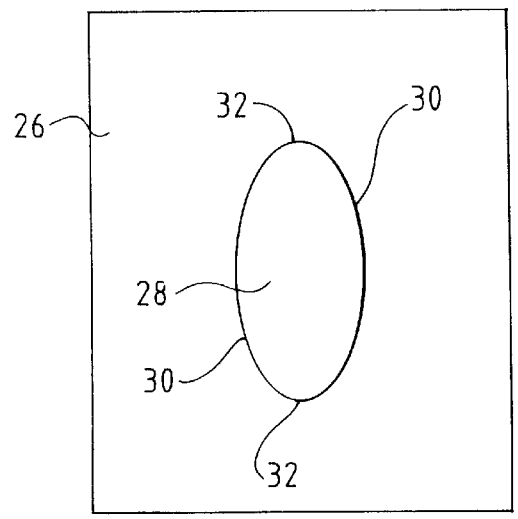
FIG. 2 is a top plan view of a support plate or panel, upon which the blind hole panel nut member of FIG. 1 is to be mounted, having an aperture defined therein having a predetermined configuration which corresponds essentially to the predetermined configuration of the blind hole panel nut member of FIG. 1.

With reference now being additionally made to FIGS. 2–4, the blind hole panel nut member 10 shown in FIG. 1 is adapted to be used in conjunction with or mounted upon a substantially planar support plate or panel in order to secure or mount components upon the support plate or panel. The support plate or panel is disclosed at 26 in FIGS. 2–4 and it is seen that the substantially planar support plate or panel 26 is provided with an aperture 28 which, in accordance with the principles and teachings of the present invention, has a geometrical configuration which is essentially identical to that of the panel nut member 10 but which is also just slightly larger in its overall dimensions.

In particular, as is the case with the panel nut member 10, the aperture 28 formed within the support plate or panel 26 comprises oppositely disposed long sides 30,30 and oppositely disposed short ends 32,32. In this manner, as can best be appreciated from FIG. 3, such related structure permits the nut member 10 to be inserted into the aperture 28 defined within the support plate or panel 26 in preparation for securely mounting the nut member 10 upon the support plate or panel 26.

In order to in fact securely mount the nut member 10 upon the support plate or panel 26, the nut member 10 is initially inserted, into the aperture 28 defined within the support plate or panel 26, in the axial depth direction as defined by axis Z such that the slots 18,18 defined within the nut member 10 are aligned in a substantially planar manner with the plane formed by the support plate or panel 26.

The upper and lower nut plate or disk portions 22,24 are also disposed, in effect, within planes disposed above and below the plane per se of the support plate or panel 26. Consequently, when it is desired to fixedly secure the panel nut member 10 upon the support plate or panel 26, the panel nut member 10 is rotated a predetermined angle α from its position shown in FIG. 3 to the position shown in FIG. 4. The exemplary nut member 10 illustrated is rotated an angle α of about 90° from the position shown in FIG. 3 to that in FIG. 4. Although this may be a preferred angle of rotation, those skilled in the art will recognize that angles less than or greater than 90° may be used, so long as the angle of rotation is not a multiple of 180°.

Figure 9:
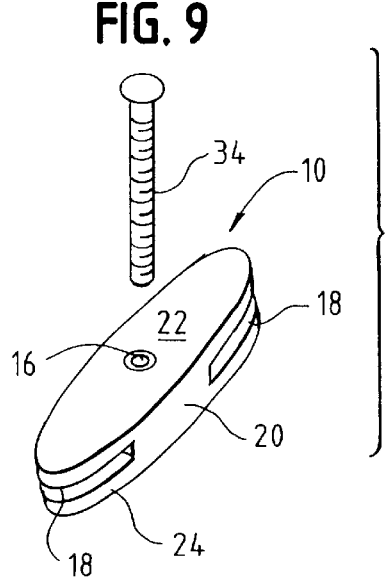
FIG. 9 is a perspective view similar to that of FIG. 1 showing, however, the first embodiment blind hole panel nut member and its associated bolt fastener prior to threaded engagement of the bolt fastener within the threaded bore defined within the blind hole panel nut member so as to form the blind hole panel nut and bolt fastener assembly.
Figure 10:
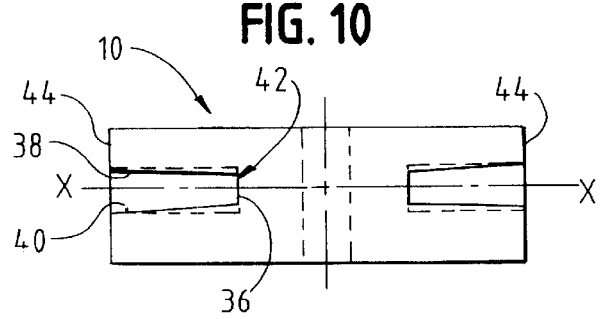
FIG. 10 is a side view of an embodiment of the blind hole panel nut member illustrating longitudinally tapering inner wall portions.

It can be appreciated that when the panel nut member 10 is rotated 90° from its position shown in FIG. 3 to the position shown in FIG. 4, as indicated by the arrow CW, the slots 18,18 formed within the nut member 10 effectively accommodate the wall portions of the support panel or plate 26 defining the oppositely disposed long sides 30,30 of the aperture 28, and the upper and lower nut plate or disk portions 22,24 of the nut member 10 are disposed upon opposite sides of the planar support plate or panel 26 and are effectively disposed in surface contact therewith. The blind hole panel nut member 10 is therefore now lockingly secured upon the support plate or panel 26 and is ready to receive a threaded bolt fastener 34 which is shown in conjunction with the blind hole panel nut member 10 in FIG. 9.

As can best be appreciated from FIGS. 3 and 4, as a result of the formation of the slotted portions 18,18 within the nut member 10, and the corresponding formation of the central core portion 20 of the nut member 10, the oppositely disposed internal peripheral surface or wall portions 36,36 may be configured and dimensioned such that when the nut member 10 is disposed in its locked position as shown in FIG. 4, the wall portions 36,36 of the core portion 20 of the nut member 10 will effectively engage the wall portions of the planar support plate or panel 26 defining the long sides 30,30 of the aperture 28 such that the nut member 10 is now in effect cam-locked with respect to the support panel or plate 26.

Alternatively, the oppositely disposed internal peripheral surface or wall portions 36,36 may be configured and dimensioned such that when the nut member 10 is disposed in its locked position as shown in FIG. 4, the wall portions 36,36 of the core portion 20 of the nut member 10 will be slightly spaced from the wall portions of the planar support plate or panel 26 defining the long sides 30, 30 of the aperture 28 such that the nut member 10 is permitted to rotate substantially freely within the aperture 28 of the support panel or plate 26. That is, the nut member 10 may be configured such that it does not lock into place on the panel 26.

These different dimensional characteristics or fabrications of the central core portion 20 of the nut member 10 will depend, for example, upon the particular application, installation, and/or removal procedures to which the blind hole panel nut member 10 and the bolt fastener 34 assembly are to be subjected. It is lastly noted that with respect to the actual installation of the blind hole panel nut member 10 within the aperture 28 defined within the support panel or plate 26, in lieu of the nut member 10 per se being, for example, manually manipulated and installed within the aperture 28 of the support panel or plate 26, an alternative installation procedure would entail the initial passage of the threaded bolt fastener 34 through a component, not shown, to be mounted upon the support plate or panel 26, and subsequent engagement of the bolt fastener 34 within the threaded bore 16 of the nut member 10 so as to form the nut-bolt fastener assembly, and subsequently, the installation of the nut member 10 within the aperture 28 of the support panel or plate 26 utilizing, in effect, the bolt fastener 34 as an operator manipulative handle.

Figure 11:
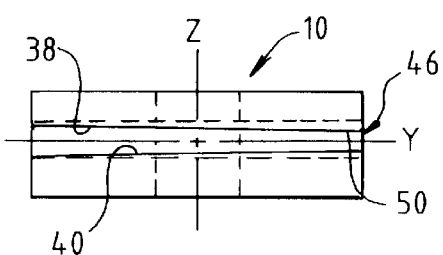
FIG. 11 is a front view of another embodiment of the blind hole panel nut member illustrating laterally or transversely tapering inner wall portions.

Referring now to FIGS. 10–14, the nut 10 can be maintained in place or secured to the panel 26, as desired, using a variety of panel engaging elements. For example, referring to FIG. 10, either or both of the upper and lower wall plate inner wall portions, 38, 40, respectively, can be formed having a taper, as indicated generally at 42. That is, the inner wall portions 38, 40 can taper inwardly from the nut end 44 to the wall 36 (i.e., toward the root), along the major longitudinal axis X. In this manner, the nut 10 is friction fit to the panel 26 as the nut 10 is rotated. Alternately, as seen in FIG. 11, the inner wall portions 38, 40 can taper transversely (along the minor lateral axis Y), across the wall portions, as indicated at 46, forming a restriction, as indicated at 48, at the terminal portion 50 (relative to rotation of the nut 10) or at the last contacting portion of the nut 10 as it is rotated onto the panel 26. Thus, at the commencement of rotation, the nut 10 freely rotates over the panel 26. However, as rotation is continued, the restriction portion 48 moves over the panel 26, and a friction fit results. This can be further configured to limit rotation of the nut 10 and to stop rotation when a desired rotational angle α is achieved.

Figure 12:
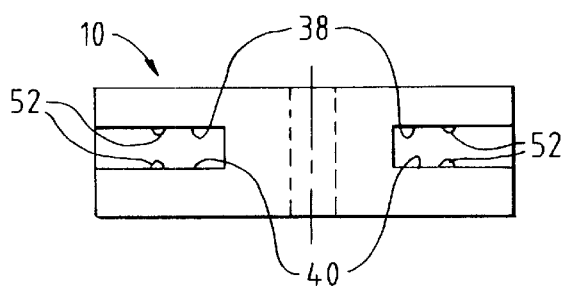
FIG. 12 is a side view of still another embodiment of the blind hole panel nut member illustrating panel engaging members formed as bosses extending inwardly from the inner wall portions.
Figure 13:
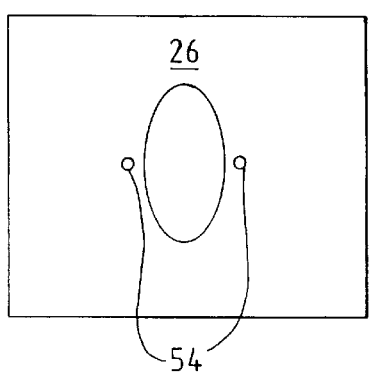
FIG. 13 is a plan view of an exemplary panel section configured for use with the nut member of FIG. 12, in which the exemplary panel section has dimples formed therein for receipt of the nut member inner wall portion bosses.

Alternately still, as seen in FIGS. 12–13, the nut 10 and panel 26 can be formed having complementary engaging elements to lock the nut 10 in place on the panel 26. For example, the nut 10 can be formed with one or more bosses 52 extending inwardly from either or both of the inner wall portions 38, 40, that cooperate with corresponding dimples 54 formed in the panel 26, to maintain the nut 10 in place. Conversely, although not shown, the bosses can be formed on the panel and the dimples formed in the nut.

Figure 14:
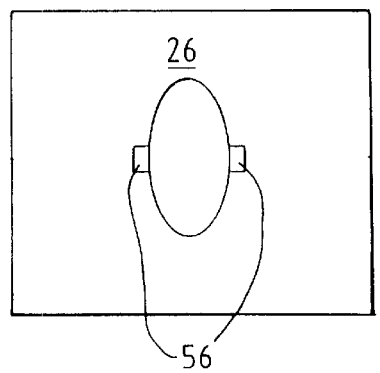
FIG. 14 is a plan view of still another exemplary panel section configured for use with the nut member, which panel section is formed having tabs thereon to frictionally engage the nut member inner wall portions.

Alternately still, as seen in FIG. 14, the panel 26 can be formed having locking tabs 56, such as the exemplary tabs folded over the edges of the panel aperture 28 to increase the thickness of the panel 26 at the edge region. This, again, provides a friction fit of the nut 10 to the panel 26.

As will be recognized by those skilled in the art, various other arrangements can be used to secure the nut 10 in place on the panel 26, at various rotational angles α (other than or at 90°), which other arrangements and rotational angles are within the scope and spirit of the present invention.

Figure 5:
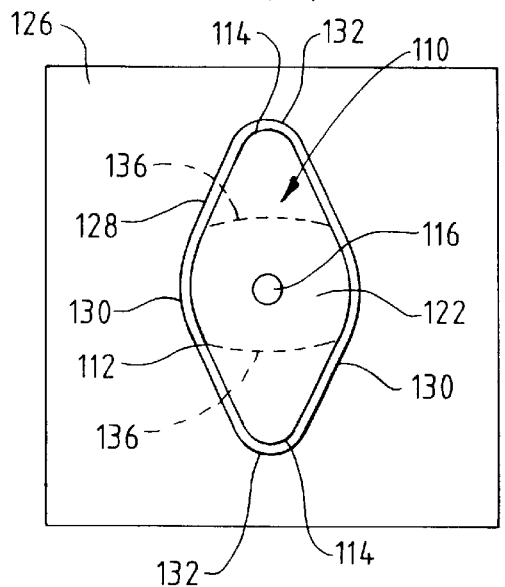
FIG. 5 is a top plan view similar to that of FIG. 3 showing, however, the insertion of a second embodiment of a new and improved blind hole panel nut member, having a substantially diamond-shaped configuration, as mounted upon a support plate or panel and prior to rotation of the blind hole panel nut member from its initial insertion position within the correspondingly configured aperture defined within the support plate or panel to its locked position upon the support plate or panel.
Figure 6:
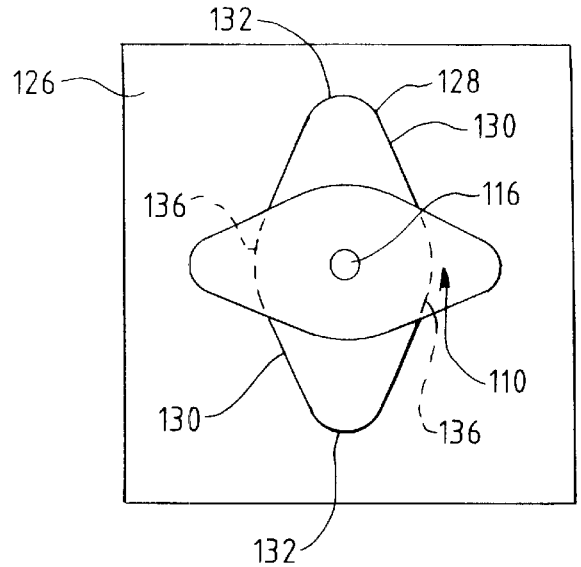
FIG. 6 is a top plan view similar to that of FIG. 4 showing, however, the position of the second embodiment blind hole panel nut member rotated 90° from its initial insertion position upon the support plate or panel to its locked position upon the support plate or panel.

With reference now being made to FIGS. 5 and 6, a second embodiment of a new and improved blind hole panel nut member is illustrated and is generally indicated by the reference character 110. It is initially to be noted that the structure and operation of the blind hole panel nut member 110 is substantially identical to the blind hole nut panel member 10 illustrated in FIGS. 1, 3, and 4, and accordingly, component parts of the nut member 110 which are similar to corresponding parts of the nut member 10 will be designated by similar reference characters except that they will be within the 100 series.

It is noted, however, that the only substantial or major difference between the nut member 110 of FIGS. 5 and 6 and the nut member 10 of FIGS. 1,3, and 4 resides in the particular geometrical configuration of the nut member 110. More particularly, it is seen that the nut member 110 has a substantially diamond-shaped configuration, and similarly for the corresponding aperture 128 formed within the support plate or panel 126. The important feature of the new and improved blind hole panel nut member 110, as was the case with the nut member 10 shown in FIGS. 1,3, and 4, resides in the fact that the nut member 110 comprises major and minor dimensions such that the nut member 110 can be rotated from its initial insertion position with respect to the aperture 128 defined within the support plate or panel 126 to the locked position with respect to the support plate or panel 126.

Figure 7:
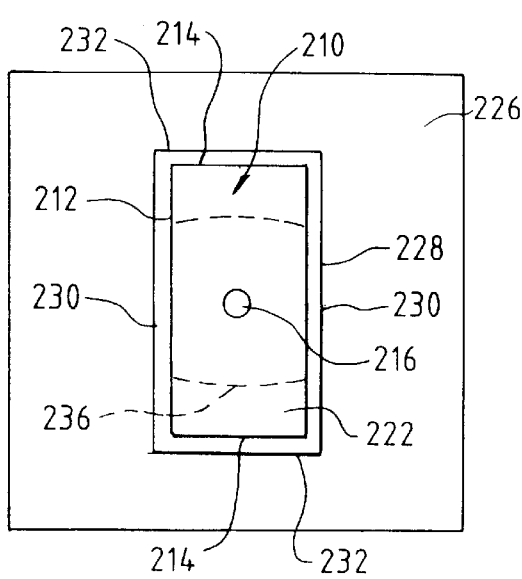
FIG. 7 is a top plan view similar to that of FIG. 5 showing, however, the insertion of a third embodiment of a new and improved blind hole panel nut member, having a substantially rectangular configuration, as mounted upon a support plate or panel and prior to rotation of the blind hole panel nut member from its initial insertion position within the correspondingly configured aperture defined within the support plate or panel to its locked position upon the support plate or panel.
Figure 8:
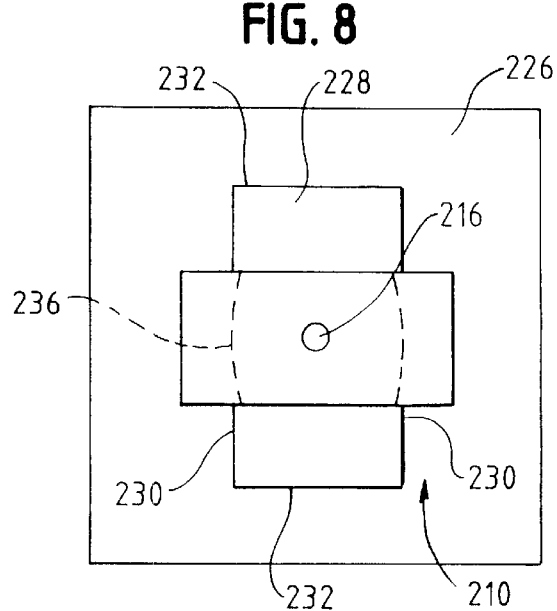
FIG. 8 is a top plan view similar to that of FIG. 6 showing, however, the position of the third embodiment blind hole panel nut member rotated 90° from its initial insertion position upon the support plate or panel to its locked position upon the support plate or panel.

In a similar manner, with reference now being made to FIGS. 7 and 8, a third embodiment of a new and improved blind hole panel nut member is illustrated and is generally indicated by the reference character 210. It is initially to be noted that the structure and operation of the blind hole panel nut member 210 is substantially identical to the blind hole nut panel member 10 illustrated in FIGS. 1, 3, and 4, and accordingly, component parts of the nut member 210 which are similar to corresponding parts of the nut member 10 will be designated by similar reference characters except that they will be within the 200 series.

It is noted, however, that the only substantial or major difference between the nut member 210 of FIGS. 7 and 8 and the nut member 10 of FIGS. 1, 3, and 4 resides in the particular geometrical configuration of the nut member 210. More particularly, it is seen that the nut member 210 has a substantially rectangular-shaped configuration, and similarly for the corresponding aperture 228 formed within the support plate or panel 226. The important feature of the new and improved blind hole panel nut member 210, as was the case with the nut member 10 shown in FIGS. 1, 3, and 4, resides in the fact that the nut member 210 comprises major and minor dimensions such that the nut member 210 can be rotated from its initial insertion position with respect to the aperture 228 defined within the support plate or panel 226 to the locked position with respect to the support plate or panel 226.

Thus, it may be seen that in accordance with the teachings and principles of the present invention, a new and improved blind hole panel nut member, and a bolt fastener to be engaged therewith so as to form a nut and bolt fastener assembly, has been developed wherein the nut member is capable of being easily installed onto and removed from a support plate or panel upon which a component is to be mounted.

In addition, as a result of the unique provision of the slotted portions within the nut member, the nut member in effect comprises a turn-type fastener member and is permitted to be a predetermined angle between its insertion or withdrawal position and its locked position with respect to the support plate or panel, whereby the nut member is self-supporting upon the support plate or panel in readiness for its assembly with the bolt fastener as a result of its upper and lower plate or disk portions being disposed upon opposite sides of the support plate or panel, or if the nut member was pre-assembled with the bolt fastener and the component to be mounted upon the support plate or panel, the nut member is then able to be manipulated by means of the bolt fastener, and the nut and bolt fastener assembly is then able to be used to securely mount particular components upon the support plate or panel as the bolt fastener is tightened with respect to the nut member.

In the present disclosure, the words "a" or "an" are to be taken to include both the singular and the plural. Conversely, any reference to plural items shall, where appropriate, include the singular.

Obviously, many variations and modifications of the present invention are possible in light of the above teachings. It is therefore to be understood that within the scope of the appended claims, the present invention may be practiced otherwise than as specifically described herein.

What is claimed is:

1. A blind hole panel nut for insertion within an aperture defined within a support panel, comprising:
    a nut member having a first predetermined major dimension defined along a first major longitudinal axis, a second predetermined minor dimension which is defined along a second minor lateral axis which is disposed substantially perpendicular to said first major axis and which is less than said first predetermined major dimension, and a depth dimension defined along a third axis which is oriented substantially perpendicular to a plane defined by said first major and second minor axes, said nut member having oppositely disposed longitudinal ends and oppositely disposed lateral sides; and
    slots defined within said oppositely disposed longitudinal ends of said nut member and at mid-portions of said nut member as considered along said third depth dimension axis such that upper and lower nut disk portions are formed upon said nut member, said slots extending longitudinally inwardly from said oppositely disposed longitudinal ends of said nut member toward an intersection of said first and second major and minor axes, and laterally across said nut member from one lateral side of said nut member to an opposite lateral side of said nut member,
    whereby when said nut member is mounted within the aperture of the support panel and rotated a predetermined angle from its initial inserted position within the aperture of the support panel, said slots defined within said oppositely disposed longitudinal ends of said nut member accommodate side wall portions of the support panel defining the support panel aperture and said upper and lower nut disk portions are disposed upon opposite sides of the support panel such that said nut member is mounted in a self-supported manner upon the support panel.

2. The blind hole panel nut as set forth in claim 1, wherein:
    said nut member has a threaded bore defined within a substantially central portion thereof for accommodating a threaded bolt fastener for securing said nut member upon the support panel.

3. The blind hole panel nut as set forth in claim 2, wherein:
    said threaded bore is located at the intersection of said first and second major and minor axes.

4. The blind hole panel nut as set forth in claim 3, wherein:
    a core portion is defined within said nut member at a substantially central location interposed between said slots so as to integrally connect together said upper and lower nut disk portions of said nut member.

5. The blind hole panel nut as set forth in claim 1, wherein:
    said nut member has a substantially elliptical configuration.

6. The blind hole panel nut as set forth in claim 1, wherein:
    said nut member has a substantially diamond-shaped configuration.

7. The blind hole panel nut as set forth in claim 1, wherein:
    said nut member has a substantially rectangular configuration.

8. The blind hole panel nut as set forth in claim 1, wherein:
    said nut member is configured to rotate about 90° from its initial position.

9. The blind hole panel nut as set forth in claim 1, wherein:
    at least one of said upper and lower nut disk portions defines a panel engaging element.

10. The blind hole panel nut as set forth in claim 9, wherein:
    said upper and lower disk portions defines inner wall portions and wherein said panel engaging element is formed as a tapering surface on at least one of said inner wall portions, said tapering surface tapering toward the other of said inner wall portions.

11. The blind hole panel nut as set forth in claim 10, wherein:
    said upper and lower disk portion inner wall portions taper toward one another.

12. The blind hole panel nut as set forth in claim 10, wherein:
    said at least one inner wall portion tapers along said first major longitudinal axis.

13. The blind hole panel nut as set forth in claim 10, wherein:
    said at least one inner wall portion tapers along said second minor lateral axis.

14. A blind hole panel nut and bolt fastener assembly for insertion within an aperture defined within a support panel so as to mount a component upon the support panel, comprising:
    a threaded bolt fastener;
    a nut member having a first predetermined major dimension defined along a first major longitudinal axis, a second predetermined minor dimension which is defined along a second minor lateral axis which is disposed substantially perpendicular to said first major axis and which is less than said first predetermined major dimension, said nut member therefore having oppositely disposed longitudinal ends and oppositely disposed lateral sides, and a depth dimension defined along a third axis which is oriented substantially perpendicular to a plane defined by said first major and second minor axes;
    a threaded bore defined within a substantially central portion of said nut member for accommodating said threaded bolt fastener for securing said nut member upon the support panel; and slots defined within said oppositely disposed longitudinal ends of said nut member and at mid-portions of said nut member as considered along said third depth dimension axis such that upper and lower nut disk portions are formed upon said nut member, said slots extending longitudinally inwardly from said oppositely disposed longitudinal ends of said nut member toward said threaded bore located at an intersection of said first and second major and minor axes, and laterally across said nut member from one lateral side of said nut member to an opposite lateral side of said nut member, whereby when said nut member is mounted within the aperture of the support panel and rotated a predetermined angle from its initial inserted position within the aperture of the support panel, said slots defined within said oppositely disposed longitudinal ends of said nut member accommodate side wall portions of the support panel defining the support panel aperture and said upper and lower nut disk portions are disposed upon opposite sides of the support panel such that said nut member is mounted in a self-supported manner upon the support panel.

15. The assembly as set forth in claim 14, wherein:
said threaded bore is located at the intersection of said first and second major and minor axes of said nut member.

16. The assembly as set forth in claim 15, wherein:
a core portion is defined within said nut member at a substantially central location interposed between said slots so as to integrally connect together said upper and lower nut disk portions of said nut member.

17. The assembly as set forth in claim 14, wherein:
said nut member has a substantially elliptical configuration.

18. The assembly as set forth in claim 14, wherein:
said nut member has a substantially diamond-shaped configuration.

19. The assembly as set forth in claim 14, wherein:
said nut member has a substantially rectangular configuration.

20. The blind hole panel nut as set forth in claim 4, wherein:
said nut member is configured to rotate about 90° from its initial position.

21. The blind hole panel nut as set forth in claim 14, wherein:
at least one of said upper and lower nut disk portions defines a panel engaging element.

22. The blind hole panel nut as set forth in claim 21, wherein:
said upper and lower disk portions defines inner wall portions and wherein said panel engaging element is formed as a tapering surface on at least one of said inner wall portions, said tapering surface tapering toward the other of said inner wall portions.

23. The blind hole panel nut as set forth in claim 22, wherein:
said upper and lower disk portion inner wall portions taper toward one another.

24. The blind hole panel nut as set forth in claim 22, wherein:
said at least one inner wall portion tapers along said first major longitudinal axis.

25. The blind hole panel nut as set forth in claim 22, wherein:
said at least one inner wall portion tapers along said second minor lateral axis.

26. A blind hole panel nut and bolt fastener assembly for insertion within an aperture defined within a support panel so as to mount a component upon a support panel, comprising:

a support panel;

an aperture defined within said support panel;

a threaded bolt fastener;

a nut member for insertion within said aperture of said support panel and having a first predetermined major dimension defined along a first major longitudinal axis, a second predetermined minor dimension which is defined along a second minor lateral axis which is disposed substantially perpendicular to said first major axis and which is less than said first predetermined major dimension, said nut member therefore having oppositely disposed longitudinal ends and oppositely disposed lateral sides, and a depth dimension defined along a third axis which is oriented substantially perpendicular to a plane defined by said first major and second minor axes;

a threaded bore defined within a substantially central portion of said nut member for accommodating said threaded bolt fastener for securing said nut member upon said support panel; and slots defined within said oppositely disposed longitudinal ends of said nut member and at mid-portions of said nut member as considered along said third depth dimension axis such that upper and lower nut disk portions are formed upon said nut member, said slots extending longitudinally inwardly from said oppositely disposed longitudinal ends of said nut member toward said threaded bore located at an intersection of said first and second major and minor axes, and laterally across said nut member from one lateral side of said nut member to an opposite lateral side of said nut member, whereby when said nut member is mounted within said aperture of the support panel and rotated a predetermined angle from its initial inserted position within said aperture of said support panel, said slots defined within said oppositely disposed longitudinal ends of said nut member accommodate side wall portions of said support panel defining said support panel aperture and said upper and lower nut disk portions are disposed upon opposite sides of said support panel such that said nut member is mounted in a self-supported manner upon said support panel.

27. The assembly as set forth in claim 26, wherein:
said threaded bore is located at the intersection of said first and second major and minor axes of said nut member.

28. The assembly as set forth in claim 27, wherein:
a core portion is defined within said nut member at a substantially central location interposed between said slots so as to integrally connect together said upper and lower nut disk portions of said nut member.

29. The assembly as set forth in claim 26, wherein:
said nut member and said aperture formed within said support panel both have substantially identical geometrical configurations.

30. The assembly as set forth in claim 29, wherein:
said nut member and said support panel aperture both have a substantially elliptical configuration.

31. The assembly as set forth in claim 29, wherein:
said nut member and said support panel aperture both have a substantially diamond-shaped configuration.

32. The assembly as set forth in claim 29, wherein:

said nut member and said support panel aperture both have a substantially rectangular configuration.

33. The blind hole panel nut as set forth in claim 26, wherein:

said nut member is configured to rotate about 90° from its initial position.

34. The blind hole panel nut as set forth in claim 26, wherein:

at least one of said upper and lower nut disk portions defines a panel engaging element.

35. The blind hole panel nut as set forth in claim 34, wherein:

said upper and lower disk portions defines inner wall portions and wherein said panel engaging element is formed as a tapering surface on at least one of said inner wall portions, said tapering surface tapering toward the other of said inner wall portions.

36. The blind hole panel nut as set forth in claim 35, wherein:

said upper and lower disk portion inner wall portions taper toward one another.

37. The blind hole panel nut as set forth in claim 35, wherein:

said at least one inner wall portion tapers along said first major longitudinal axis.

38. The blind hole panel nut as set forth in claim 35, wherein:

said at least one inner wall portion tapers along said second minor lateral axis.

* * * * *